Oct. 17, 1950      J. E. JENDRISAK      2,526,359
APPARATUS FOR BENDING GLASS SHEETS

Filed July 28, 1947      3 Sheets-Sheet 1

Inventor
Joseph E. Jendrisak
By Nobbe & Swope
Attorneys

Oct. 17, 1950     J. E. JENDRISAK     2,526,359
APPARATUS FOR BENDING GLASS SHEETS

Filed July 28, 1947     3 Sheets-Sheet 2

Inventor
Joseph E. Jendrisak
by Nobbe & Swope
Attorneys

Oct. 17, 1950     J. E. JENDRISAK     2,526,359
APPARATUS FOR BENDING GLASS SHEETS
Filed July 28, 1947     3 Sheets-Sheet 3
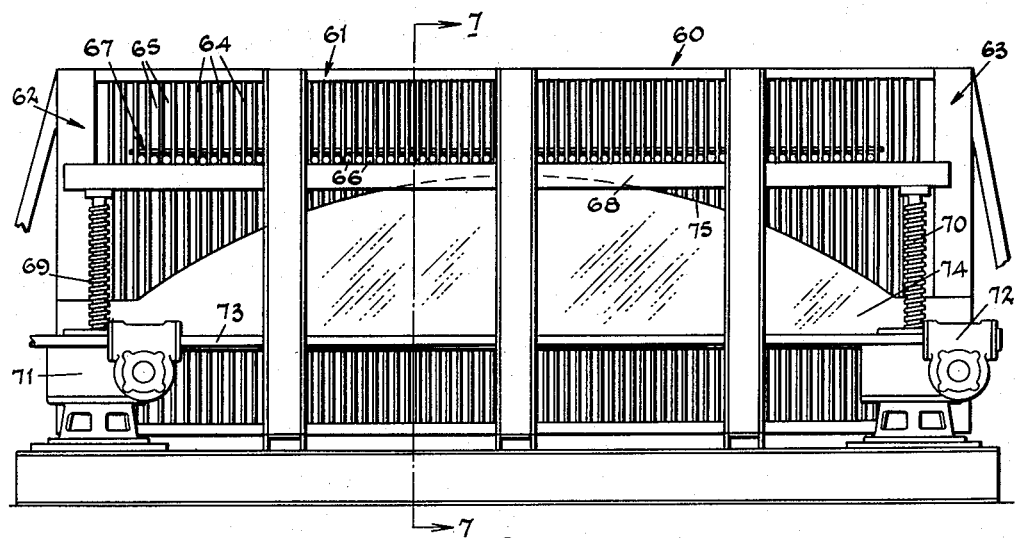

Patented Oct. 17, 1950

2,526,359

UNITED STATES PATENT OFFICE 2,526,359

APPARATUS FOR BENDING GLASS SHEETS

Joseph E. Jendrisak, Rossford, Ohio, assignor to Libbey-Owens-Ford Glass Company, Toledo, Ohio, a corporation of Ohio Application July 28, 1947, Serial No. 764,228

7 Claims. (Cl. 49—67)

1

The present invention relates to apparatus for bending glass sheets or plates.

An object of the invention is the provision of an improved type of apparatus which may be employed for bending glass sheets to various curvatures.

Another object of the invention is the provision of improved bending apparatus embodying a glass supporting bed, the contour of which can be easily and quickly varied to conform to the desired curvature to be given the glass sheet.

Another object of the invention is the provision of improved bending apparatus including interchangeable template plates having profile edges corresponding to the curvature to be imparted to the glass sheet and freely supporting a plurality of horizontal glass carrying elements constituting the glass supporting bed.

A further object of the invention is the provision of bending apparatus of the above character including novel means for mounting the template plates and glass carrying elements and for maintaining them in association with one another in such a manner that the template plates may be readily changed when it is desired to alter the curvature of the glass being bent without requiring removal of the glass carrying elements.

A still further object of the invention is the provision of bending apparatus of the above character including a frame to which the template plates are removably secured, the glass carrying elements being movably associated with the frame and template plates in a manner to permit rapid and convenient substitution of template plates of different profiles and the corresponding rearranging of the glass carrying elements from said frame.

Other objects and advantages of the invention will become more apparent during the course of the following description, when taken in connection with the accompanying drawings.

In the drawings, wherein like numerals are employed to designate like parts throughout the same:

Fig. 6 is a side elevation of another modified

2 type of bending apparatus embodying the invention;

Fig. 7 is a transverse sectional view therethrough; and

Fig. 8 is a transverse section through a conventional type of stationary bending furnace.

Figure 1:
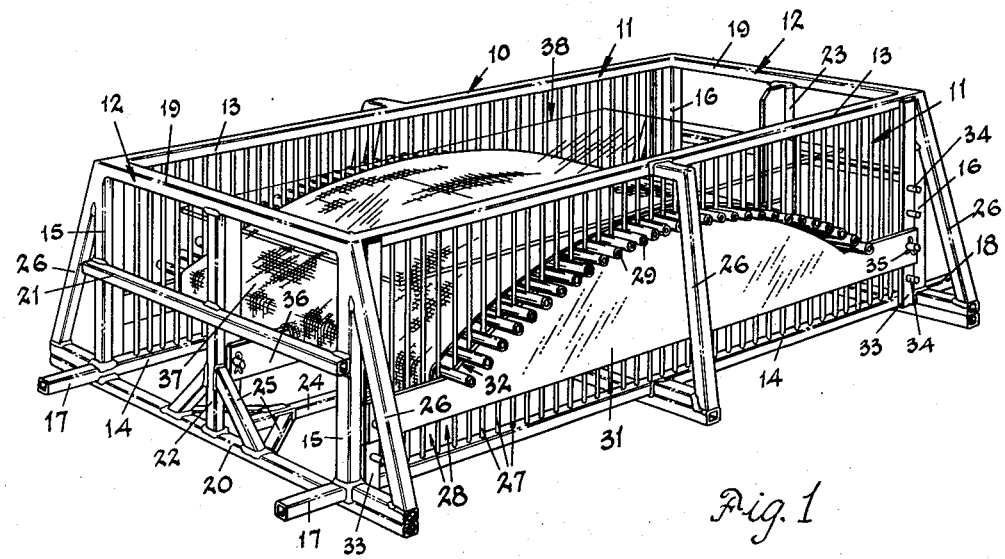
Fig. 1 is a perspective view of bending apparatus constructed in accordance with the invention.
Figure 2:
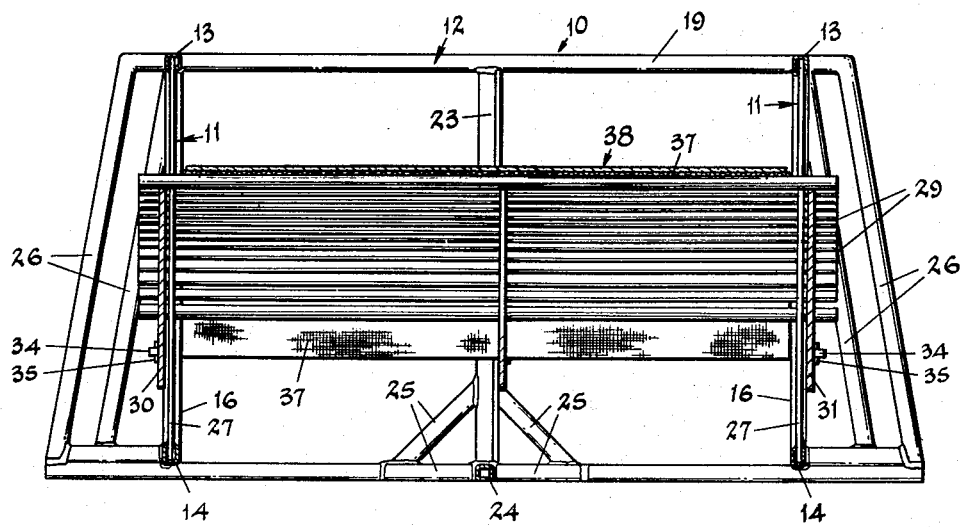
Fig. 2 is a transverse sectional view therethrough.

With reference now to the drawings and particularly to Figs. 1 and 2, the bending apparatus shown therein comprises a rectangular frame or cage 10 made up of side members 11 and end members 12 preferably, though not necessarily, constructed from commercially produced metal tubing which may be easily assembled as by welding or in any other desired manner. Each side member 11 includes upper and lower horizontal sections 13 and 14 connected at their opposite ends by vertical sections or corner posts 15 and 16. If desired, the lower horizontal sections 14 of said side members may be extended beyond the corner posts 15 and 16 to provide suitable handles 17 and 18 to facilitate handling of the frame.

Each end member 12 comprises upper and lower horizontal sections 19 and 20 and an intermediate horizontal section 21 also secured to the corner posts 15 and 16. The frame 10 may be suitably reinforced by vertical braces 22 and 23 carried by the end members 12 and by a longitudinally extending strengthening member 24 arranged between and secured to the lower sections 20 of said end members. These reinforcing members may be further braced by struts 25 arranged at the opposite ends of the frame, while additional angle braces 26 may be provided at opposite ends of the frame and also intermediate the ends thereof if desired.

Extending between and secured to the upper and lower horizontal sections 13 and 14 of each side member 11 are a plurality of spaced parallel rods 27, with the rods carried by opposed side members being aligned with one another to provide registering vertical guideways 28 between said rods. Arranged between the side members 11 and projecting at their opposite ends through the vertical guideways 28, formed by the rods 27, are a plurality of independent horizontal glass carrying elements 29, preferably in the form of thin wall pipes. It has been found that pipes of approximately five-eighths inch outside dimension will afford sufficiently small spaces between their points of tangency to properly support the glass during the bending operation.

Removably secured to the opposite side members 11, outwardly thereof, are template plates 30 and 31, the upper edges 32 of which have a profile corresponding to the curvature to be given the glass sheet. The opposite end portions of the glass carrying elements 29 are freely supported upon the upper profile edges 32 of the template plates 30 and 31 for three vertical movement within the guideways 28.

The upper edges 32 of template plates 30 and 31 are thus finished to the desired curvature and when said plates are secured to the side members 11, the glass carrying elements 29 will rest freely on the said upper edges 32 and cooperate to form a supporting bed of the desired contour for the glass sheet to be bent.

The template plates 30 and 31 may be secured to the frame 10 by any suitable means that will permit ready removal thereof while still retaining them against movement during the bending operation. For example, there may be secured to each side member 11, adjacent opposite ends thereof, vertical straps 33 provided with outwardly projecting pegs 34 received through openings in the ends of the template plates and which plates are secured on said pegs by cotter pins or the like 35.

To prevent sagging of the glass carrying elements 29 between the side members 11, a template plate 36 may be provided between said side members and removably secured to the vertical braces 22 and 23 in the same manner that the template plates 30 and 31 are secured to the side members 11. Since the template plates can be readily removed from the pegs 34, it will be apparent that plates having upper edges 32 of different curvatures can be secured to said side members in a simple and convenient manner. Likewise, since the glass carrying elements 29 rest freely upon the upper edges 32 of the template plates, they can be retained within the guideways 28 during changing of the said plates. Consequently, it is not necessary that the glass carrying elements 29 be removed from the frame during changing of the template plates when it is desired to vary the curvature of the glass sheets being bent.

In order to afford a continuous, unbroken supporting surface for the glass sheet during bending, it is preferred that the glass carrying elements 29 be covered with a sheet or layer of glass cloth, asbestos, or the like 37.

In operation, a flat sheet of glass to be bent is placed horizontally upon the covered glass carrying elements 29 as indicated at 38, and the apparatus then introduced into a furnace in which the glass is heated to its softening point, whereupon the opposite ends of the sheet will gradually bend downwardly by gravity to conform to the curvature of the supporting bed as is well understood in the art.

Figure 3:
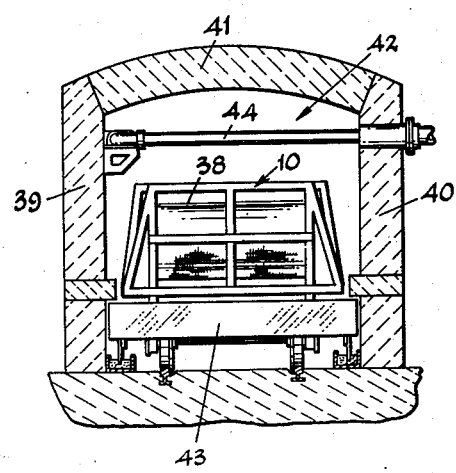
Fig. 3 is a transverse section through a conventional type of continuous bending furnace with which the bending apparatus of this invention may be used.

For example, the bending apparatus above described may be passed through a continuous bending furnace of the type shown in Fig. 3, which is of conventional tunnel-like construction and of any desired length. The furnace herein shown comprises opposite side walls 39 and 40 and a crown 41 cooperating to form a substantially closed tunnel chamber 42 through which cars or trucks 43 carrying the bending apparatus 10 and glass sheet 38 to be bent can be passed in a substantially straight path. The tunnel chamber 42 can be heated in any desired manner such as by means of the radiating heating tubes 44 extending transversely thereof above the path of travel of the cars or trucks. The said tunnel chamber 42 is ordinarily divided into a plurality of separate treating zones or sections whereby, during the bending process, the glass sheet will progressively be conveyed through a preheating zone, a bending zone, and finally into and through a cooling or annealing zone.

Figure 4:
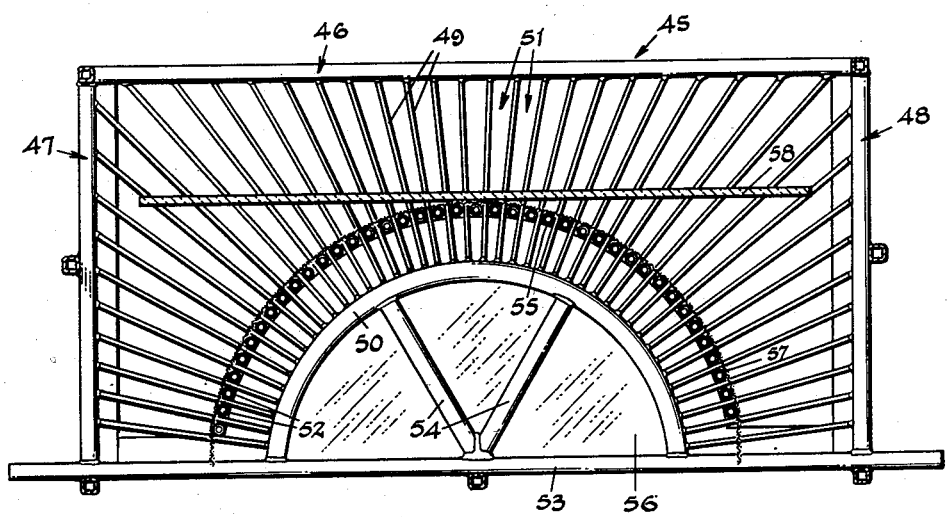
Fig. 4 is a transverse sectional view through a modified type of bending apparatus.

In Fig. 4 is illustrated a modified type of bending apparatus which has been found desirable in producing a curvature approaching the semi-circular. This apparatus also comprises a rectangular frame or cage 45 including side members 46 and opposite end members 47 and 48. Carried by each side member 46 are rods 49, but it will be noted that instead of being vertically arranged as in Fig. 1, they extend upwardly and outwardly from a semi-circular support 50 to provide substantially radial guideways 51 for the glass carrying elements 52. The arcuate support 50 is welded or otherwise suitably secured at its opposite ends to the lower horizontal section 53 of the side member 46 and further braced, if desired, by suitable struts 54. By arranging the rods 49 in this manner, it is possible to maintain the glass carrying elements 52 uniformly spaced from one another to facilitate the bending of the glass sheet to a semi-circular curvature.

The elements 52 are freely supported upon the upper curved edges 55 of template plates 56 which are removably secured to the opposite side members of the frame as described above in connection with Figs. 1 and 2. Covering the elements 52 is a layer of glass cloth 57 or other suitable material forming a continuous supporting surface for the glass sheet 58 to be bent.

Figure 5:
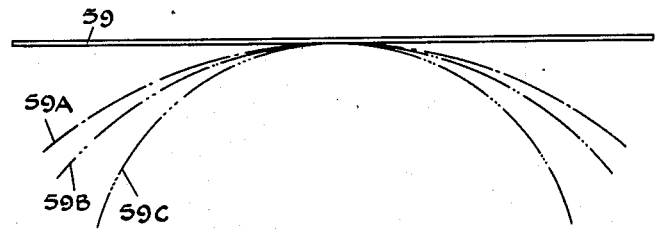
Fig. 5 illustrates diagrammatically three different curvatures to which glass sheets may be bent with the apparatus of Figs. 1 and 4.

In Fig. 5 is illustrated diagrammatically three different types of curves which may be produced. The flat sheet of glass to be bent is indicated by the numeral 59 and upon heating will bend downwardly by gravity to curvature 59A, 59B, or 59C. Curvatures 59A and 59B can be produced on the apparatus shown in Figs. 1 and 2, while semi-circular curvature 59C is best produced upon the apparatus shown in Fig. 4.

In Figs. 6 and 7 is illustrated another type of bending apparatus embodying the principles of the present invention but which is designed primarily for the bending of relatively large sheets or plates of glass. In this instance, the glass sheet is held in a horizontal position until it has been uniformly heated to the desired temperature, after which it is permitted to gradually bend downwardly by gravity to conform to the curvature of the supporting bed.

This apparatus also comprises a rectangular frame 60 having side members 61 and end members 62 and 63 suitably braced and strengthened. Carried by the side members 61 are the spaced vertical rods 64 providing guideways 65 therebetween for the glass carrying elements or pipes 66 which support the glass sheet to be bent. When the glass sheet is initially laid upon the elements 66 and during the preheating cycle in the furnace, the said elements are supported in the same horizontal plane by bars 68 extending longitudinally along opposite sides of the frame 60. Each bar 68 is carried at its opposite ends by vertical screw shafts 69 and 70 having their lower ends received within gear cases 71 and 72 and being driven through suitable gearing from a common drive shaft 73.

Removably carried by the side members 61 are template plates 74 having curved upper edges 75, and upon lowering of the bars 68 the glass carrying elements will also move downwardly within the guideways 65 and rest upon the curved upper edges 75 of the template plates 74 to determine the curvature to which the glass sheet will bend.

In Figs. 6 and 7, the bars 68 are shown as supporting the glass carrying elements 67 in a horizontal plane above the template plates 74. During the preheating cycle and until the glass obtains a semi-plastic, or critical bending condition, it is maintained in a horizontal plane or zone of temperature and the influence of the heat uniformly distributed, thereby raising the entire body of glass to the bending temperature. Any tendency of the glass to sag into a cooler zone is thus prevented and distortion is eliminated from the central areas. When the bending temperature has been reached, the screw shafts 69 and 70 are operated to lower the bars 68 and, as the bars descend, the glass carrying elements 66 are lowered until they rest upon the contoured edges 75 of template plates 74. The glass sheet will of course bend downwardly to assume the curvature of the template plates and the descent of the bars may be sufficiently rapid that the entire depth of arc is produced while the sheet is in a semi-plastic condition. The end portions of the sheet as well as the central portion thereof are acted upon substantially simultaneously and any tendency toward distortion is dissipated by reaction of the entire sheet both to the preheating and to the bending.

In Fig. 8 is illustrated, by way of example, a type of so-called stationary bending furnace in which bending of the glass may be effected. This furnace comprises a floor 76, opposite side walls 77 and 78, and an arch 79 enclosing a heating chamber 80 which may be heated by a plurality of gas burners 81 projecting through openings in the side walls 77 and 78. The flames from the burners are directed upwardly toward the arch by vertical baffle walls 82 and 83 disposed inwardly of the side walls 77 and 78 respectively, said baffle walls terminating some distance beneath the arch so that the heating flames are directed upwardly and pass into the heating chamber proper of the furnace adjacent the arch.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass bending apparatus of the character described, spaced side members provided with a series of elongated guideways, stationary glass carrying elements arranged horizontally between said side members and having portions loosely received in said guideways and freely slidable therein independently of one another, and means secured to said side members and having portions shaped to the curvature to be given the glass sheet and freely engageable by said glass carrying elements.

2. In sheet glass bending apparatus of the character described, spaced side members provided with a series of elongated guideways, stationary horizontal glass carrying elements arranged between said side members and having their opposite end portions loosely received in said guideways and freely slidable therein independently of one another, and means removably carried by said side members and having portions shaped to the curvature to be given the glass sheet and freely engageable by said glass carrying elements.

3. In sheet glass bending apparatus of the character described, spaced side members provided with a series of elongated guideways, stationary glass carrying elements arranged horizontally between said side members and having portions loosely received in said guideways and freely slidable therein independently of one another, and template plates removably secured to said side members and having portions shaped to the curvature to be given the glass sheet and freely engageable by said glass carrying elements.

4. In sheet glass bending apparatus of the character described, spaced side members provided with a series of elongated guideways, stationary horizontal elongated glass carrying elements arranged between said side members and having their opposite end portions loosely received in said guideways and freely slidable therein independently of one another, and template plates removably carried by said side members and having their upper edges shaped to the curvature to be given the glass sheet and freely engageable by said glass carrying elements.

5. In sheet glass bending apparatus of the character described, spaced side members provided with a series of spaced rods providing elongated guideways therebetween, stationary horizontal glass carrying elements extending between the side members and having their opposite end portions loosely received in said guideways freely slidable therein independently of one another, and template plates removably secured to said side members and having upper edges shaped to the curvature to be imparted to the glass sheet and upon which the glass carrying elements are freely supported.

6. In sheet glass bending apparatus of the character described, a substantially rectangular frame including opposite side and end members, spaced substantially vertical rods carried by said side members providing elongated guideways therebetween, stationary horizontal elongated glass carrying elements extending between the side members and having their opposite end portions loosely received in said guideways and freely slidable therein independently of one another, and template plates removably secured to said side members and having upper edges shaped to the curvature to be imparted to the glass sheet and upon which the glass carrying elements are freely supported.

7. In sheet glass bending apparatus of the character described, a substantially rectangular frame including opposite side and end members, spaced rods carried by said side members and extending upwardly and outwardly to provide substantially radial guideways, horizontal elongated glass carrying elements extending between the side members and having their opposite end portions loosely received in said guideways, and template plates removably secured to said side members and having their upper edges shaped to the curvature to be imparted to the glass sheet and freely engageable by said glass carrying elements.

JOSEPH E. JENDRISAK.

REFERENCES CITED

The following references are of record in the file of this patent:

UNITED STATES PATENTS

| Number | Name | Date |
|--------|------|------|
| 833,436 | Borland et al. | Oct. 16, 1906 |
| 991,025 | Robier | May 2, 1911 |
| 2,223,124 | Owen | Nov. 26, 1940 |